July 4, 1972   M. MANDEL   3,674,333
RAINBOW KALEIDOSCOPE
Filed Aug. 19, 1970
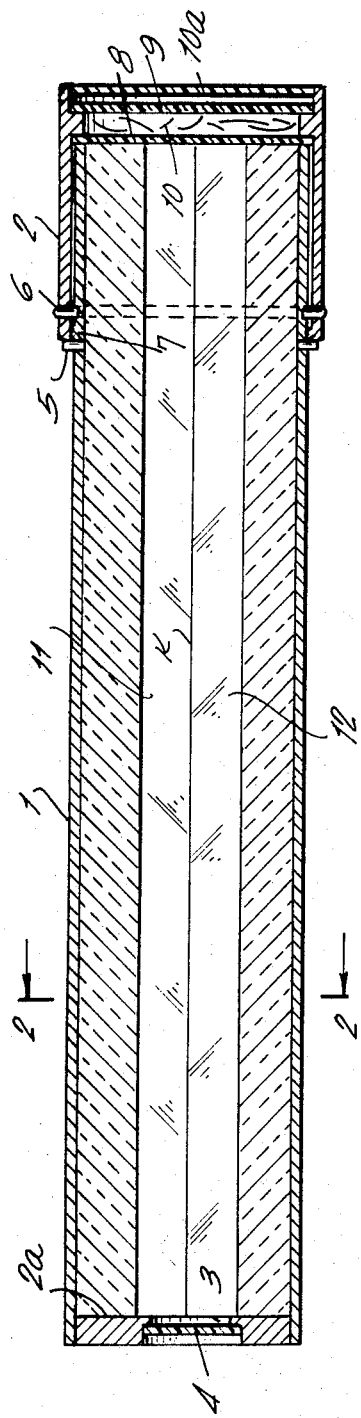
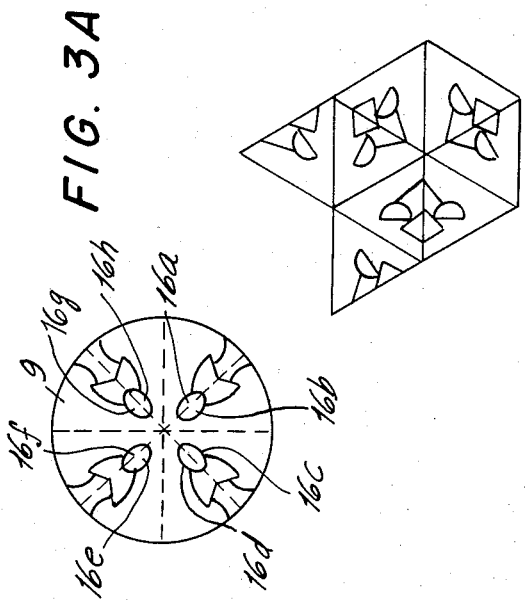
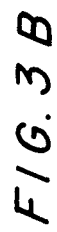
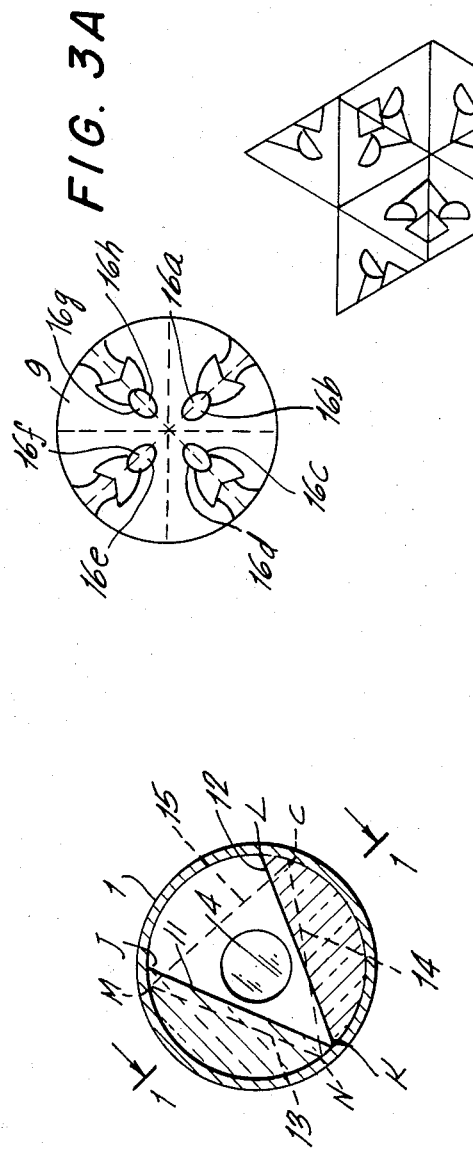
INVENTOR.
MARK MANDEL
BY Eliot S. Gerber
ATTORNEY

United States Patent Office 3,674,333
Patented July 4, 1972

3,674,333
RAINBOW KALEIDOSCOPE
Mark Mandel, 890 West End Ave.,
New York, N.Y. 10025
Filed Aug. 19, 1970, Ser. No. 65,195
Int. Cl. G02b 27/08
U.S. Cl. 350—5      8 Claims

ABSTRACT OF THE DISCLOSURE

This novel kaleidoscope consists of an elongated tubular member having an eye piece opening at one end and open at the opposite end, a polarized sheet covering the eye piece opening, three or two elongated mirrors positioned at angles to each other, and a short tubular member rotatably connected to the elongated tubular member. The outer end of the short tubular member is covered by two parallel sheets, the inner sheet being clear and the outer sheet being polarized. A number of mica pieces, or other polarized pieces, are positioned between the parallel sheets.

DESCRIPTION

The present invention relates to toys and more particularly to an improved kaleidoscope.

A kaleidoscope presents a colored geometrical pattern to the viewer which is obtained by passing light through colored glass or plastic. The image is then reflected by mirrors positioned within an elongated tube.

The kaleidoscope has been known for many years and has essentially remained the same. Various suggestions have been made to obtain a varied or brighter pattern, but generally these suggestions have involved considerable complexity and expense and consequently have not been commercially adopted.

It is an objective of the present invention to provide a kaleidoscope in which the colors are relatively brighter and more luminescent.

It is a further objective of the present invention to provide such a kaleidoscope in which there is a color change within each piece of the geometric patterns with a small degree of rotation of a rotatable member of the kaleidoscope.

It is a further objective of the present invention to provide such a kaleidoscope which, through rotation of the rotatable member, will provide a darker or lighter (brighter or less bright) image, depending upon the direction of rotation.

It is a further objective of the present invention to provide such a kaleidoscope which is about as low in cost as kaleidoscopes of conventional construction, which utilizes materials which do not present any difficulty in manufacture or assembly, and which kaleidoscope may be stored and transported without malfunction.

Other objectives of the present invention will be apparent from the accompanying drawings and the following detailed description, which description gives the inventor's best mode of practicing the invention.

In the drawings:

FIG. 1 is a side cross-sectional view of the construction of the kaleidoscope of the present invention;

FIG. 2 is a cross-sectional view taken on lines 2—2 of FIG. 1; and

FIGS. 3A and 3B are top views of the geometric patterns which may be viewed through the two embodiments of the present invention.

As shown in FIG. 1, the kaleidoscope generally consists of two case members 1 and 2. The first case member 1 is an elongated tube which may be constructed of cardboard or other suitable material. One end of the tube 1 is covered by a washer-like wall 2a of metal or cardboard and having an opening 3, the opening 3 forming an eye piece. The eye piece consists of a sheet 4 which covers the opening 3, the sheet 4 being a small disk, for example, one-half inch in circumference. The sheet 4, at its edges beyond the opening, is adhered to the washer-like member 2a. The sheet 4 is preferably of a linear polarized synthetic resin rigid film, although other polarized sheet materials may be used.

A first upstanding circular pin 5 (or flange) is a stop member for flange 7 on case member 2. A pin 6 (or flange) fits, projecting inwardly from case member 2, in a circular groove around the outer circumference of the tube 1. The groove provides a means for retaining the second case member 2 and permits its rotation by hand. Other means may alternatively be used to retain the case members and permit their relative rotation.

The second case member 2 is a short tubular member which likewise may be manufactured of cardboard or other suitable material. The outer end of the case member 2 is covered by three parallel sheets of material. The inner sheet 8 is of a clear synthetic resin film which is stiff and self-supporting, although, alternatively, other suitable materials such as glass or a translucent plastic or glass may be used. The second and outer sheet 9, which is parallel to sheet 8, is of a polarized optical material. In the space between sheets 8 and 9 there is a plurality of flat pieces 10 which are also of optical material. Preferably the sheet 9 is of a synthetic plastic resin film and the pieces 10 are flat pieces of mica. Preferably the sheet 9 is translucent rather than transparent, that is, it is frosted as well as optically polarized. The pieces of mica 10 are able to move and slide over each other freely within the space formed between the sheets 8 and 9. Other materials may be substituted for mica as long as they are optically photo-rotary.

Preferably, as shown in FIG. 1, the outer sheet 9 is covered by a protective self-supporting (stiff) sheet 10a of translucent or transparent synthetic resin film which is held parallel to it by the tube. For example, sheet 10a may be frosted (translucent) to diffuse the light and to protect the polarized sheet 9. If the polarized sheet 9 is coated with a polarizing material, the coated surface should face the sheet 10a.

As shown in FIG. 2, the elongated mirrors 11 and 12 are positioned at an angle to each other and run the length of the tubular case 1. The mirrors may be of conventional glass silvered on the back or, alternatively, may be shiny tin coated steel or unsilvered glass. An alternative arrangement is the use of three mirrors as shown in the dashed lines and as indicated by the mirrors 13, 14 and 15. The mirrors 13, 14 and 15 form an equilateral triangle.

The geometric pattern of FIG. 3A is formed by the two-mirror arrangements consisting of mirrors 11 and 12 so positioned that the angle between them is 45 degrees. The pattern of FIG. 3B (in which the figure is only a part of the total pattern) is formed by the equilateral triangular arrangement of the mirrors 13, 14 and 15. These patterns are representative of the images which would be seen by a mirror. As shown in FIG. 3A the single piece of mica 15a has seven reflections 16b–16h, forming an eight-fold figure. As the telescoped case members are relatively rotated the internal color of each piece changes. This effect is completely different from the conventional kaleidoscope in which rotation has no effect on the color of each piece.

Polarized light is light which has its electric vector oriented in a predictable fashion with respect to the propagation direction. Ordinary light is unpolarized light in which the electric vector is randomly oriented. The human eye is unable to detect the difference between polarized and unpolarized light. In using the kaleidoscope there is a potential angle between the meeting axes of the pair of linear polarizers, namely, eye piece sheet 4 and outer sheet 9. When the polarizers 4 and 9 are parallel they are transparent. However, when they are crossed at right angles the combination of the two linear polarizers is opaque.

The present invention utilizes linear sheet polarizers for eye piece 4 and outer sheet 9. Generally there are three types of sheet polarizers presently available. The first type is a plastic resin sheet in which a microcrystalline polarizer consisting of crystals of dichroitic material is embedded parallel to each other in the sheet. For example, such a sheet may be manufactured by imbedding quinine iodosulfate in viscous polyvinyl chloride and extruding the material through a slit. A second type of sheet polarizer is obtained by placing an iodine solution on a transparent oriented sheet of plastic resin such as polyvinyl alcohol. The iodine molecules become parallel to the oriented molecules of the resin sheet and the resulting dyed sheet is strongly dichroitic. The third type of plastic sheet material is a synthetic resin film in which the resin molecules are oriented, for example, polyvinylene. Each of these types of sheet polarized material is quite inexpensive since the plastic resin films themselves are inexpensive and the processes they undergo to become polarized are low in cost. The linear polarized sheets will have a transmittance of from 40-50% of light parallel to the axis and practically no transmittance for light perpendicular to the axis.

The flat pieces 10 of material which are placed between the parallel sheets are of a photo-rotary material or a wave plate (retardation sheet). It produces circularly or elliptically polarized light. In a wave plate polarized light with its electric vector parallel to the phase axis travels faster than light polarized parallel to the slow axis. With a given thickness of the material, for light traversing a wave plate, there is a definite phase shift between the fast components and the slow components. Wave plates may be prepared from sections of quartz, calcite or other crystals. Preferably the pieces 10 are made of oriented plastic resin or of split mica. Preferably the wave plate is a visible quarter-wave plate and may be easily fabricated from mica.

In operation, the user points the kaleidoscope toward a light source with one eye at the eye piece. He regards the geometric pattern having an unusual luminosity. He then slowly turns the telescoped case members, for example, by rotating the outer member. Each individual piece of the pattern changes color as the case member is rotated. In addition, the entire pattern and its background become lighter or darker. Thirdly, as in other kaleidoscopes, the pattern changes as the pieces between the parallel sheets change position. Fourthly, the colors may be made to change and also grow sequentially brighter and darker while the pieces of mica remain in a fixed position relative to each other, by rotating the elongated tube member while holding the case member immobile.

Modifications may be made in the present invention within the scope of the subjoined claims. For example, the mirrors may be eliminated. The resulting image is luminous, although not a complex geometric pattern. Only one mirror need be used, in which case bilateral symmetric geometric figures are seen. The two mirrors 11 and 12 may be used at an angle other than 45 degrees, yielding a pattern other than that exemplified in FIG. 3A. More mirrors than three may be used, and various angles may be employed between the mirrors.

I claim:
1. A kaleidoscope comprising:
a first case member having a first small opening for an eye piece and a second opening opposite the first opening;
an eye piece consisting of a sheet of optical polarized material covering said first opening and attached to said first case member;
a second case member, means connecting said first and second case members so that they may be revolved relative to each other about an axis of rotation, two parallel sheets connected to said second case member substantially perpendicular to said axis, the inner of the parallel sheets being transparent or translucent, and the outer being a sheet of optical polarized material, a plurality of pieces of optical photo-rotary material lying between said parallel sheets;
said eye piece and parallel sheets lying along an optical axis to permit light to pass, in sequence, through the outer polarized parallel sheet, the photo-rotary pieces, the inner parallel sheet, and the polarized sheet of the eye piece; and
a plurality of mirrors within said first case member and positioned at an angular relationship to each other to cause cross-reflections.

2. A kaleidoscope as in claim 1 wherein the photo-rotary pieces are flat and are mica slices.

3. A kaleidoscope as in claim 1 wherein the mirrors are flat and are parallel to said axis.

4. A kaleidoscope as in claim 1 wherein the first and second case members are tubular cylinders with the first case member being an elongated tubular cylinder and with the first case member telescoping within the second case member.

5. A kaleidoscope as in claim 1 wherein the mirrors are three elongated mirrors arranged so that in cross-section they form an equilateral triangle.

6. A kaleidoscope as in claim 1 wherein said polarized sheets are of synthetic resin film.

7. A kaleidoscope as in claim 1 wherein the eye piece sheet and the parallel sheet are linear optically polarized sheets and the polarized pieces are circularly or elliptically optically polarized.

8. A kaleidoscope as in claim 1 and including a translucent or transparent sheet parallel to said outer sheet and on the side of said outer sheet opposite to said flat pieces.

References Cited

UNITED STATES PATENTS

| | | | |
|---|---|---|---|
| 2,991,689 | 7/1961 | Taylor | 350—4 |
| 3,315,391 | 4/1967 | Lane et al. | 350—159 |
| 1,398,858 | 11/1921 | House | 350—4 |
| 3,039,356 | 6/1962 | Knittel | 350—5 |

LOUIS R. PRINCE, Primary Examiner

D. M. YASICH, Assistant Examiner

U.S. Cl. X.R.

350—159